(12) United States Patent
He

(10) Patent No.: US 12,035,260 B2
(45) Date of Patent: Jul. 9, 2024

(54) WIRELESS COMMUNICATION METHOD, NETWORK DEVICE, AND TERMINAL DEVICE

(71) Applicant: GUANGDONG OPPO MOBILE TELECOMMUNICATIONS CORP., LTD., Guangdong (CN)

(72) Inventor: Chuanfeng He, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 301 days.

(21) Appl. No.: 17/643,355

(22) Filed: Dec. 8, 2021

(65) Prior Publication Data
US 2022/0104157 A1 Mar. 31, 2022

Related U.S. Application Data

(63) Continuation of application No. PCT/CN2019/117651, filed on Nov. 12, 2019.

(51) Int. Cl.
*H04W 56/00* (2009.01)
*H04L 27/26* (2006.01)
(Continued)

(52) U.S. Cl.
CPC ..... *H04W 56/001* (2013.01); *H04L 27/26025* (2021.01); *H04W 72/0453* (2013.01); *H04W 72/23* (2023.01)

(58) Field of Classification Search
CPC ............. H04L 27/2601; H04L 27/2602; H04L 27/26025; H04W 56/00; H04W 56/001;
(Continued)

(56) References Cited

U.S. PATENT DOCUMENTS

2019/0068348 A1 2/2019 Nam
2019/0159261 A1 5/2019 Jung
(Continued)

FOREIGN PATENT DOCUMENTS

CN 104106223 A 10/2014
CN 110198205 A 9/2019
(Continued)

OTHER PUBLICATIONS

Huawei, HiSilicon, "Initial access procedure in NR unlicensed", 3GPP TSG RAN WG1 Meeting #98bis, R1-1910046, Oct. 14-20, 2019, 14 pages.
(Continued)

*Primary Examiner* — Matthew W Genack
(74) *Attorney, Agent, or Firm* — PERKINS COIE LLP

(57) ABSTRACT

Provided are a wireless communication method, a network device, and a terminal device. The network device may indicate a Quasi-Co-Located (QCL) parameter in different indication manners according to whether a Synchronization Signal Block (SSB) is associated with System Information Block 1 (SIB1), which is favorable for ensuring that the terminal device correctly receives QCL indication information. The method includes that: a network device determines SIB1 association indication information of a first SSB, the SIB1 association indication information being configured to indicate whether the first SSB is associated with SIB1; the network device determines whether the first SSB bears indication information of a QCL parameter and/or an indication manner for the QCL parameter in the first SSB based on whether the first SSB is associated with SIB1; and the network device sends the first SSB.

12 Claims, 6 Drawing Sheets

(51) Int. Cl.
*H04W 72/0453* (2023.01)
*H04W 72/23* (2023.01)

(58) Field of Classification Search
CPC .......... H04W 56/0015; H04W 56/002; H04W 72/04; H04W 72/044; H04W 72/0453; H04W 72/20; H04W 72/21; H04W 72/23; H04W 72/231; H04W 72/232
See application file for complete search history.

(56) References Cited

U.S. PATENT DOCUMENTS

| | | | |
|---|---|---|---|
| 2020/0178309 A1 | 6/2020 | Tie et al. | |
| 2020/0404537 A1 | 12/2020 | Harada | |
| 2021/0136591 A1* | 5/2021 | Si | H04W 48/16 |

FOREIGN PATENT DOCUMENTS

| | | | | |
|---|---|---|---|---|
| CN | 110299978 A | 10/2019 | | |
| CN | 110401929 A | 11/2019 | | |
| WO | 2019116477 A1 | 6/2019 | | |
| WO | WO-2019116477 A1 * | 6/2019 | ........... | G06F 40/166 |
| WO | 2019161793 A1 | 8/2019 | | |

OTHER PUBLICATIONS

Xiaomi, "Discussion on NR-U initial access procedure", 3GPP TSG RAN WG1 #99, R1-1912993, Nov. 18-22, 2019, 3 pages.
First Office Action of the Japanese application No. 2021-577459, issued on Aug. 15, 2023, 6 pages with English translation.
Supplementary European Search Report in the European application No. 23177405.0, mailed on Sep. 13, 2023, 12 pages.
Ericsson "Quasi-co-location information in SIB1 and RRC Reconfiguration", 3GPP Draft; R2-1711372; Oct. 9, 2017-Oct. 13, 2017 Oct. 8, 2017 (Oct. 8, 2017),XP051343357. 4 pages.
Ericsson "The QCL framework in NR", 3GPP Draft;R1-1714318; Aug. 21, 2017-Aug. 25, 2017 Aug. 20, 2017 (Aug. 20, 2017), XP051317104. 7 pages.
Supplementary European Search Report in the European application No. 19952367.1, mailed on Jun. 15, 2022. 12 pages.
Office Action of the Indian application No. 202117057509, issued on Jun. 15, 2022. 8 pages with English translation.
Written Opinion of the International Search Authority in the international application No. PCT/CN2019/117651, mailed on Mar. 29, 2022. 9 pages with English translation.
First Office Action of the Chinese application No. 202111587943.5, issued on Jan. 11, 2023. 14 pages with English translation.
3GPP TSG RAN WG1 #99 R1-1912567, Reno, USA, Nov. 18-22, 2019, Source: OPPO, Title: Enhancements to initial access procedure for NR-U. Agenda Item: 7.2.2.2.2, Document for: Discussion and Decision.
International Search Report in the international application No. PCT/CN2019/117651, mailed on Jul. 29, 2020.
3GPP TS 38.213 V15.2.0 (Jun. 2018), 3rd Generation Partnership Project; Technical Specification Group Radio Access Network; NR; Physical layer procedures for control, (Release 15).
3GPP TS 38.211 V15.2.0 (Jun. 2018), 3rd Generation Partnership Project; Technical Specification Group Radio Access Network; NR; Physical channels and modulation. (Release 15).
3GPP TSG-RAN WG2 #108 R2-1914648, Reno, USA, Nov. 18-22, 2019, Revision of R2-1912646, Agenda Item: 6.2.3.2, Source: Ericsson, Title: RRM in NR-U, Document for: Discussion, Decision. 23 pages.
Notice of Allowance of the Chinese application No. 202111587943. 5, issued on Apr. 9, 2023. 2 pages with English translation.
First Written Opinion of the Singaporean application No. 11202114169R, issued on Mar. 4, 2024. 10 pages.
Hearing Notice of the Indian application No. 202117057509, issued on Apr. 8, 2024. 2 pages with English translation.

* cited by examiner

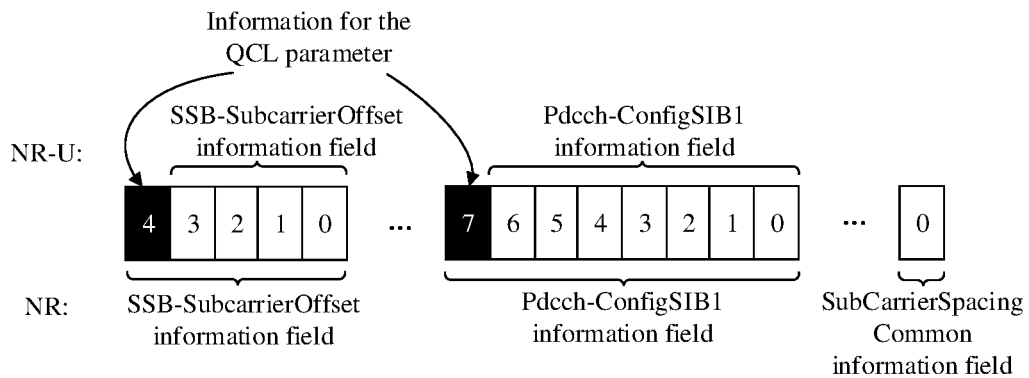

FIG. 6

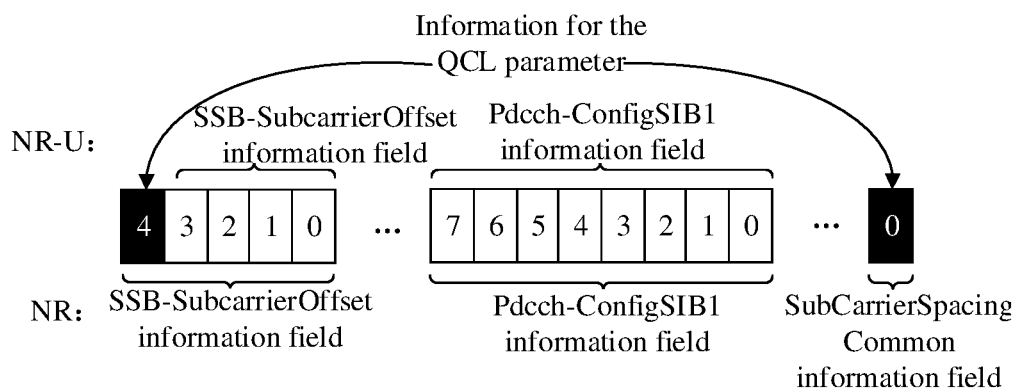

| The terminal device receives a first SSB, the first SSB including SIB1 association indication information, and the SIB1 association indication information being configured to indicate whether the first SSB is associated with SIB1 | S310 |
|---|---|
| The terminal device determines whether the first SSB bears indication information of a QCL parameter and/or an indication manner for the QCL parameter in the first SSB based on whether the first SSB is associated with SIB1 | S320 |

FIG. 8

WIRELESS COMMUNICATION METHOD, NETWORK DEVICE, AND TERMINAL DEVICE

CROSS-REFERENCE TO RELATED APPLICATION

This application is a continuation application of International Patent Application No. PCT/CN2019/117651 filed on Nov. 12, 2019, the disclosure of which is incorporated herein by reference in its entirety.

TECHNICAL FIELD

Embodiments of the disclosure relate to the field of communication, and particularly to a wireless communication method, a network device, and a terminal device.

SUMMARY

The embodiments of the disclosure provide a wireless communication method, a network device, and a terminal device. The network device may indicate a QCL parameter in different indication manners according to whether an SSB is associated with SIB1, which is favorable for ensuring that the terminal device correctly receives QCL indication information. A first aspect provides a method for wireless communication, which may include that: a network device determines SIB1 association indication information of a first SSB, the SIB1 association indication information being configured to indicate whether the first SSB is associated with SIB1; the network device determines whether the first SSB bears indication information of a QCL parameter and/or an indication manner for the QCL parameter in the first SSB based on whether the first SSB is associated with SIB1; and the network device sends the first SSB.

A second aspect provides a method for wireless communication, which may include that: a terminal device receives a first SSB, the first SSB including SIB1 association indication information, and the SIB1 association indication information being configured to indicate whether the first SSB is associated with SIB1; and the terminal device determines whether the first SSB bears indication information of a QCL parameter and/or an indication manner for the QCL parameter in the first SSB based on whether the first SSB is associated with SIB1.

A third aspect provides a network device, which is configured to execute the method in the first aspect or any possible implementation mode of the first aspect. Specifically, the network device includes units configured to execute the method in the first aspect or any possible implementation mode of the first aspect.

A fourth aspect provides a terminal device, which is configured to execute the method in the second aspect or any possible implementation mode of the second aspect. Specifically, the terminal device includes units configured to execute the method in the second aspect or any possible implementation mode of the second aspect.

A fifth aspect provides a network device, which may include a processor and a memory. The memory may be configured to store a computer program. The processor may be configured to call and run the computer program stored in the memory to execute the method in the first aspect or each implementation mode thereof.

A sixth aspect provides a terminal device, which may include a processor and a memory. The memory may be configured to store a computer program. The processor may be configured to call and run the computer program stored in the memory to execute the method in the second aspect or each implementation mode thereof.

A seventh aspect provides a chip, which may be configured to implement the method in any one of the first aspect to the second aspect or each implementation mode thereof.

Specifically, the chip may include a processor, configured to call and run a computer program in a memory to enable a device installed with the chip to execute the method in any one of the first aspect to the second aspect or each implementation mode thereof.

An eighth aspect provides a computer-readable storage medium, which may be configured to store a computer program, the computer program enabling a computer to execute the method in any one of the first aspect to the second aspect or each implementation mode thereof.

A ninth aspect provides a computer program product, which may include a computer program instruction, the computer program instruction enabling a computer to execute the method in any one of the first aspect to the second aspect or each implementation mode thereof.

A tenth aspect provides a computer program, which may run in a computer to enable the computer to execute the method in any one of the first aspect to the second aspect or each implementation mode thereof.

Based on the technical solutions, the network device may determine an indication manner for indication information of a QCL parameter in a PBCH according to whether an SSB is associated with SIB1, which is favorable for ensuring that the terminal device correctly receives the indication information of the QCL parameter.

BRIEF DESCRIPTION OF THE DRAWINGS

FIG. 6 is a schematic diagram of another indication manner for a QCL parameter according to an embodiment of the disclosure.

FIG. 7 is a schematic diagram of another indication manner for a QCL parameter according to an embodiment of the disclosure.

FIG. 8 is a schematic diagram of another wireless communication method according to an embodiment of the disclosure.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

In a New Radio (NR)-based access to unlicensed spectrum (NR-U) system, a terminal device, after receiving Synchronization Signal/Physical Broadcast Channel Blocks (SSBs), need to know a Quasi-Co-Located (QCL) relationship between the SSBs to jointly process SSBs that satisfy the QCL relationship. To obtain a QCL relationship between SSB position indexes, a QCL parameter Q is needed to be known, Q representing the largest number of SSBs that do not satisfy the QCL relationship.

In some implementation modes, the QCL parameter Q may be born in a Physical Broadcast Channel (PBCH). Specifically, part of bits in an SSB-SubcarrierOffset information field or part of bits in a Physical Downlink Control Channel (PDCCH) configuration System Information Block (SIB) 1 (pdcch-ConfigSIB1) information field in the PBCH are required to be occupied to bear Q. However, when an SSB is not associated with SIB1, a frequency-domain position of a second SSB associated with SIB1 is required to be born through the SSB-SubcarrierOffset information field and the pdcch-ConfigSIB1 information field.

The technical solutions of the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5th-Generation (5G) system.

Figure 1:
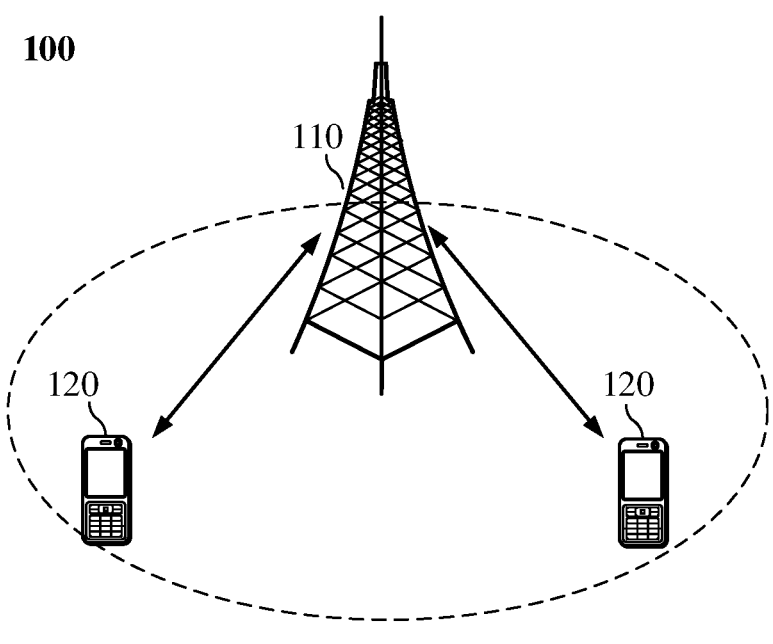
FIG. 1 is a schematic diagram of an application scenario according to an embodiment of the disclosure.

Exemplarily, FIG. 1 shows a communication system 100 to which the embodiments of the disclosure are applied. The communication system 100 may include a network device 110. The network device 110 may be a device communicating with a terminal device 120 (or called a communication terminal and a terminal). The network device 110 may provide a communication coverage for a specific geographical region and communicate with a terminal device located in the coverage. Optionally, the network device 110 may be a Base Transceiver Station (BTS) in a GSM or CDMA system, or may be a NodeB (NB) in a WCDMA system, or may be an Evolutional Node B (eNB or eNodeB) in an LTE system or a wireless controller in a Cloud Radio Access Network (CRAN). Alternatively, the network device may be a mobile switching center, a relay station, an access point, a vehicle device, a wearable device, a hub, a switch, a network bridge, a router, a network-side device in a future 5G network, a network device in a future evolved Public Land Mobile Network (PLMN), etc.

The communication system 100 may further include at least one terminal device 120 within the coverage of the network device 110. The "terminal device" in the disclosure includes, but not limited to, a device arranged to receive/send a communication signal through a wired line connection, for example, through Public Switched Telephone Network (PSTN), Digital Subscriber Line (DSL), digital cable and direct cable connections, and/or another data connection/network) and/or through a wireless interface, for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter, and/or another communication terminal, and/or an Internet of Things (IoT) device. The terminal device configured to communicate through a wireless interface may be called a "wireless communication terminal", a "wireless terminal", or a "mobile terminal." Examples of the mobile terminal include, but not limited to, a satellite or cellular telephone, a Personal Communication System (PCS) terminal capable of combining a cellular radio telephone and data processing, faxing and data communication capabilities, a Personal Digital Assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic device including a radio telephone transceiver. The terminal device may refer to an access terminal, User Equipment (UE), a user unit, a user station, a mobile station, a mobile radio station, a remote station, a remote terminal, a mobile device, a user terminal, a terminal, a wireless communication device, a user agent, or a user device. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal device in the 5G network, a terminal device in the future evolved PLMN, etc.

Optionally, the terminal device 120 may perform Device to Device (D2D) communication.

Optionally, the 5G system or the 5G network may also be called an NR system or an NR network.

FIG. 1 exemplarily shows one network device and two terminal devices. Optionally, the communication system 100 may include multiple network devices and another number of terminal devices that may be included in coverage of each network device. No limits are made thereto in the embodiments of the disclosure.

Optionally, the communication system 100 may further include another network entity such as a network controller and a mobility management entity. No limits are made thereto in the embodiments of the disclosure.

It is to be understood that a device with a communication function in the network/system in the embodiments of the disclosure may be called a communication device. For example, for the communication system 100 shown in FIG. 1, communication devices may include the network device 110 and terminal device 120 with the communication function. The network device 110 and the terminal device 120 may be the specific devices as described above and will not be elaborated herein. The communication devices may further include other devices in the communication system 100, for example, other network entities like a network controller and a mobility management entity. No limits are made thereto in the embodiments of the disclosure.

It is to be understood that terms "system" and "network" in the disclosure may usually be interchanged in the disclosure. In the disclosure, term "and/or" is only an association relationship describing associated objects and represents that three relationships may exist. For example, A and/or B may represent three conditions: i.e., independent existence of A, existence of both A and B, and independent existence of B. In addition, character "/" in the disclosure usually represents that previous and next associated objects form an "or" relationship.

In an NR system, when a first SSB detected by a terminal device is not associated with SIB1, the terminal device is required to continue detecting a second SSB associated with SIB1 to obtain SIB1. In some implementation modes, when the first SSB is not associated with SIB1, a network device may indicate that the first SSB is not associated with SIB1 through a reserved value in an SSB-SubcarrierOffset information field ($k_{SSB}$) in a PBCH of the first SSB and indicate a frequency-domain position of the second SSB associated with SIB1 through bits in $k_{SSB}$ and bits in a pdcch-ConfigSIB1 information field, so that the terminal device may detect the second SSB based on the frequency-domain position of the second SSB to receive SIB1.

In the NR system, an SSB may be sent in a time window (for example, a 5 ms time window), and may be repeatedly sent according to a period. Optionally, the period may be, for example, 5 ms, 10 ms, 20 ms, 40 ms, 80 ms, and 160 ms. In a time window, the largest number of SSBs that may be sent by the network device is L, and the number of SSBs that are actually sent may be less than L.

For the terminal device, an SSB index may be obtained through a received SSB, the SSB index corresponding to a relative position of the SSB in the time window. The terminal device may determine a position of the SSB in a radio frame based on the SSB index and a half frame indication born in the PBCH, thereby implementing frame synchronization.

For a QCL relationship, the terminal device may assume that SSBs with the same SSB index are in the QCL relationship. That is, when indexes of SSBs received by the terminal device at different moments are the same, it is determined that the SSBs are in the QCL relationship.

In an NR-U system, channel resources in an unlicensed spectrum may be shared. When using these shared resources, a communication device is required to listen to an idle channel and then use the channel. In such case, it is difficult to ensure that SSBs are periodically sent and received at fixed positions, because sequential positions where a sending device succeeds in Listen Before Talk (LBT) are unpredictable.

Therefore, multiple SSB candidate positions are provided in the NR-U system to ensure that there are still enough SSB candidate positions available for sending SSBs after successful LBT to avoid impacts of an LBT failure on SSB reception. Specifically, Y SSB candidate positions may be configured in a time window, at most L SSBs may be transmitted at the Y candidate positions for SSB transmission, L being less than Y, and SSBs may be sent only after the sending device obtains an available channel.

Figure 2:
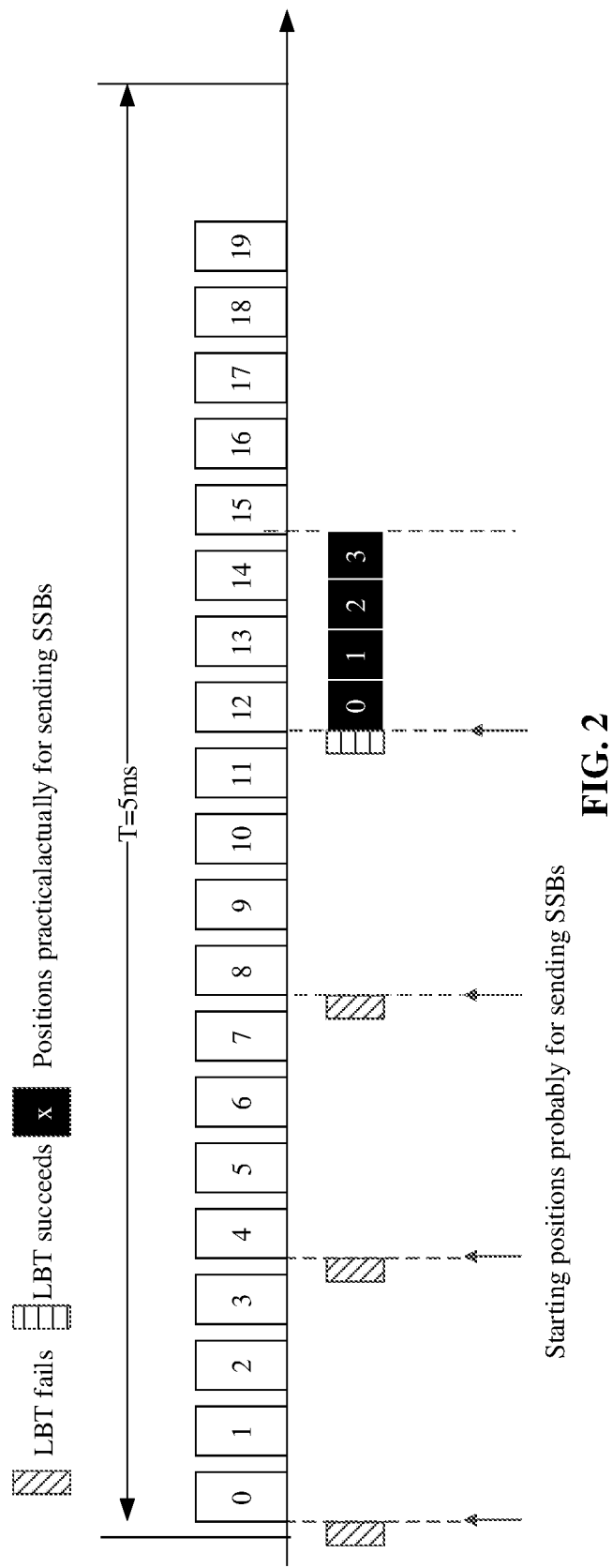
FIG. 2 is a schematic diagram of SSB sending positions in an NR-U system.

For example, for a 5 ms time window, L is 4, and Y is 20. As shown in FIG. 2, if the network device succeeds in LBT prior to candidate position 12, SSBs with SSB indexes 0 to 3 are started to be sent from candidate position 12. Therefore, in the NR-U system, actual sending positions of SSBs may start from any one of the Y candidate positions.

To enable the terminal device to determine the QCL relationship between SSBs, in an implementation mode, it may be assumed that SSBs with the same result obtained by performing modulus calculation on Q using SSB position indexes of the SSBs in a time window are in the QCL relationship. Therefore, for obtaining the QCL relationship between the SSB position indexes, the terminal device is required to know the QCL parameter Q, Q being the largest number of SSBs that do not satisfy the QCL relationship. Optionally, Q may be 1, 2, 4, and 8.

In some implementation modes, the network device may bear the QCL parameter through part of bits in the SSB-SubcarrierOffset information field or part of bits in a pdcch-ConfigSIB1 information field in the PBCH.

From the above descriptions, it can be seen that, when an SSB is not associated with SIB1, a frequency-domain position of a second SSB associated with SIB1 is required to be born through the SSB-SubcarrierOffset information field and the pdcch-ConfigSIB1 information field. In such case, how to indicate the QCL parameter is a problem to be solved.

Figure 3:
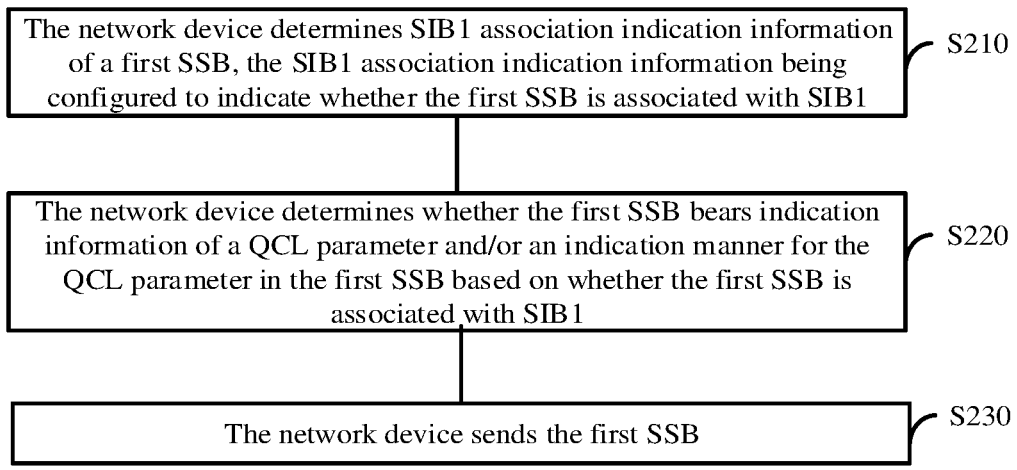
FIG. 3 is a schematic diagram of a wireless communication method according to an embodiment of the disclosure.

FIG. 3 is a schematic flowchart of a method 200 for wireless communication according to an embodiment of the disclosure. The method 200 may be executed by the network device in the communication system shown in FIG. 1. As shown in FIG. 3, the method 200 may include at least part of the following contents.

In S210, the network device determines SIB1 association indication information of a first SSB, the SIB1 association indication information being configured to indicate whether the first SSB is associated with SIB1.

In S220, the network device determines whether the first SSB bears indication information of a QCL parameter and/or an indication manner for the QCL parameter in the first SSB based on whether the first SSB is associated with SIB1.

In S230, the network device sends the first SSB.

Optionally, in the embodiment of the disclosure, the first SSB may include at least one of following signals:

a Primary Synchronization Signal (PSS), a Secondary Synchronization Signal (SSS), or a PBCH.

For convenient understanding and description, information born in the PBCH in a licensed spectrum will be briefly introduced.

The information born in the PBCH in the unlicensed spectrum includes A-bit information coming from a higher layer and also includes physical-layer (layer-1) related information. The layer-1 related information includes a System Frame Number (SFN), a half-frame indication, an SSB index, etc.

Specifically, the information born in the PBCH includes a Master Information Block (MIB) from the higher layer, totally A bits, i.e., $\bar{a}_0, \bar{a}_1, \bar{a}_2, \bar{a}_3, \ldots, \bar{a}_{\bar{A}-1}$, and an 8-bit information from layer 1, $\bar{a}_{\bar{A}}, \bar{a}_{\bar{A}+1}, \bar{a}_{\bar{A}+2}, \bar{a}_{\bar{A}+3}, \ldots, \bar{a}_{\bar{A}+7}$. The A-bit MIB includes 6 bits of the SFN, 1 bit of a subCarrierSpacingCommon information field, 4 bits of an SSB-SubcarrierOffset information field, Demodulation Reference Signal (DMRS) related information, resource information of a PDCCH scheduling a SIB, etc. 1 idle bit is also included.

The SSB-SubcarrierOffset information field includes 4 bits and is configured to indicate an offset $k_{SSB}$ between Physical Resource Block (PRB) grids of SSB and non-SSB channels or signals, the offset $k_{SSB}$ including 0 to 11 subcarriers or 0 to 23 subcarriers. The SSB-SubcarrierOffset information field may correspond to lower 4 bits of the parameter $k_{SSB}$. The subCarrierSpacingCommon information field is configured to indicate a subcarrier spacing of SIB1, Message 2/4 (Msg.2/4) for initial access, paging messages, and broadcast System Information (SI)-messages.

In the 8-bit information from layer 1, i.e., $\bar{a}_{\bar{A}}, \bar{a}_{\bar{A}+1}, \bar{a}_{\bar{A}+2}, \bar{a}_{\bar{A}+3}, \ldots, \bar{a}_{\bar{A}+7}, \bar{a}_{\bar{A}}, \bar{a}_{\bar{A}+1}, \bar{a}_{\bar{A}+2}, \bar{a}_{\bar{A}+3}$ are the lower 4 bits of the SFN, $\bar{a}_{\bar{A}+4}$ is a half-frame indication. When $L_{SSB}=64$, $\bar{a}_{\bar{A}+5}, \bar{a}_{\bar{A}+6}, \bar{a}_{\bar{A}+7}$ are the top 3 bits of the SSB index, otherwise $\bar{a}_{\bar{A}+5}$ is the highest bit of the parameter $k_{SSB}$, and $\bar{a}_{\bar{A}+6}, \bar{a}_{\bar{A}+7}$ are reserved bits or idle bits. $L_{SSB}$ is the largest SSB number and corresponds to abovementioned L, and $k_{SSB}$ is subcarrier offset information of the SSB. When a system bandwidth is less than 6 GHz, namely $L_{SSB}$ is less than 64, the layer-1 related information includes 2 idle bits.

It can be understood that the number of the bits occupied by each information field in the PBCH in the licensed spectrum is merely an example. The number of the bits occupied by each information field may also be adjusted according to an implementation requirement, a stipulation in a protocol, etc. No limits are made thereto in the embodiment of the disclosure.

In an NR-U system, the PBCH may also include each abovementioned information field, and the number of bits of each information field may be the same as that in an NR system. In some embodiments of the disclosure, the information field in the PBCH may be used to bear the indication information of the QCL parameter or bear frequency-position information of a second SSB.

In some embodiments of the disclosure, the network device may indicate the QCL parameter using a third indication manner.

As an example, the third indication manner may be bearing the indication information of the QCL parameter through part of bits in a pdcch-ConfigSIB1 information field and part of bits in an SSB-SubcarrierOffset information field. The number of bits that are specifically used may be determined based on the number of bits occupied by the indication information of the QCL parameter. For example, when the indication information of the QCL parameter occupies 2 bits, the indication information of the QCL parameter may be born through 1 bit in the pdcch-ConfigSIB1 information field and 1 bit in the SSB-SubcarrierOffset information field, as shown in FIG. 6.

Figure 4:
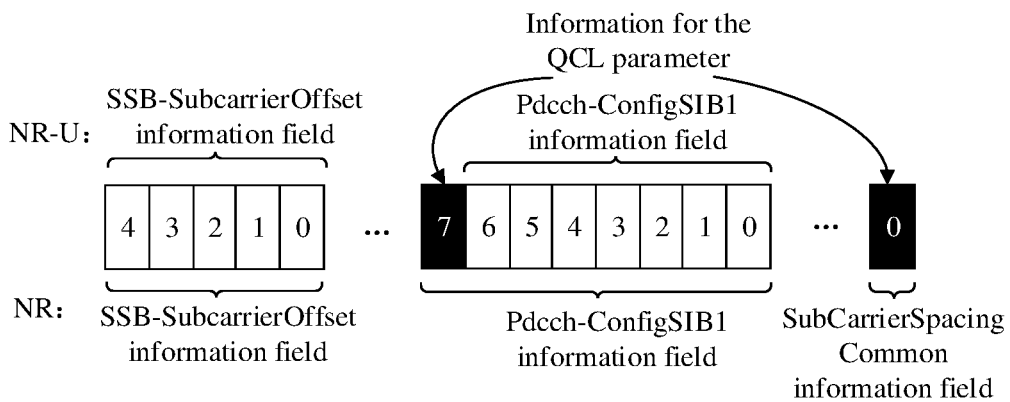
FIG. 4 is a schematic diagram of an indication manner for a QCL parameter according to an embodiment of the disclosure.

As an example, the third indication manner may be bearing the indication information of the QCL parameter through part of bits in the pdcch-ConfigSIB1 information field and part of bits in the subCarrierSpacingCommon information field. The number of bits that are specifically used may be determined based on the number of the bits occupied by the indication information of the QCL parameter. For example, when the indication information of the QCL parameter occupies 2 bits, the indication information of the QCL parameter may be born through 1 bit in the pdcch-ConfigSIB1 information field and 1 bit in the subCarrierSpacingCommon information field, as shown in FIG. 4.

That is, no matter whether the first SSB is associated with SIB1, the network device may indicate the QCL parameter in the third indication manner. Furthermore, the terminal device may know information about the QCL parameter and thus may determine a QCL relationship between SSBs based on the QCL parameter and further jointly process SSBs that satisfy the QCL relationship, to improve the system performance.

In some other embodiments of the disclosure, the network device may determine whether the first SSB bears the indication information of the QCL parameter based on whether the first SSB is associated with SIB1.

For example, in response to the first SSB being not associated with SIB1, the network device may determine that the first SSB does not bear the indication information of the QCL parameter. In such case, when the first SSB detected by the terminal device is not associated with SIB1, the first SSB is required to indicate a frequency-domain position of a second SSB associated with SIB1, and the terminal device may acquire the QCL parameter from the second SSB. That is, the QCL parameter obtained from the first SSB is meaningless, and in such case, the first SSB may not bear the QCL parameter, so that a certain information field may be saved to indicate the frequency-domain position of the second SSB or other information.

For another example, in response to the first SSB being associated with SIB1, the network device may determine that the first SSB bears the indication information of the QCL parameter. Furthermore, the network device may determine that the indication manner for the indication information of the QCL parameter in the first SSB is a specific indication information. Optionally, the specific indication manner may be bearing the indication information of the QCL parameter through part of bits in an information field of the PBCH.

As some examples, the specific indication manner is any one of following indication manners:

indicating the QCL parameter through K bits in the pdcch-ConfigSIB1 information field, K being a positive integer, and K being equal to the number of bits occupied by the QCL parameter;

indicating the QCL parameter through A bits in the pdcch-ConfigSIB1 information field and B bits in the subCarrierSpacingCommon information field, A and B being positive integers, and a sum of A and B being equal to the number of the bits occupied by the QCL parameter;

indicating the QCL parameter through C bits in the pdcch-ConfigSIB1 information field and D bits in the SSB-SubcarrierOffset information field, C and D being positive integers, and a sum of C and D being equal to the number of the bits occupied by the QCL parameter; or indicating the QCL parameter through E bits in the SSB-SubcarrierOffset information field and F bits in the subCarrierSpacingCommon information field, E and F being positive integers, and a sum of E and F being equal to the number of the bits occupied by the QCL parameter.

As some examples, if the indication information of the QCL parameter occupies 2 bits, K is 2;

A is 1, and B is 1;

C IS 1, and D is 1; and

E is 1, and F is 1.

In some other alternative embodiments, the network device may determine the indication manner for the QCL parameter in the first SSB based on whether the first SSB is associated with SIB1.

For example, in response to the first SSB being not associated with SIB1, it may be determined that the indication manner for the QCL parameter in the first SSB is a first indication manner.

For another example, in response to the first SSB being associated with SIB1, it may be determined that the indication manner for the QCL parameter in the first SSB is a second indication manner.

As an example, the first indication manner may be the same as the second indication manner, namely bit fields used for bearing the indication information of the QCL parameter in the first indication manner and the second indication manner are the same.

It is to be understood that: bit fields being the same may refer to that the used information fields and the numbers of used bits in the information fields are the same and does not mean that each bit in the information fields has a different meaning. For example, when the indication information of the QCL parameter needs 2 bits, a sequence of bit fields of the 2 bits may be the same or different.

For example, the first indication manner is indicating through 1 bit in the pdcch-ConfigSIB1 information field and 1 bit in the SSB-SubcarrierOffset information field, the 1 bit in the pdcch-ConfigSIB1 information field corresponding to bit 1 in the indication information, and the 1 bit in the SSB-SubcarrierOffset information field corresponding to bit 0 in the indication information. The second indication manner is indicating through 1 bit in the pdcch-ConfigSIB1 information field and 1 bit in the SSB-SubcarrierOffset information field, the 1 bit in the pdcch-ConfigSIB1 information field corresponding to bit 1 in the indication information, and the 1 bit in the SSB-SubcarrierOffset information field corresponding to bit 1 in the indication information. In such case, it may be determined that the first indication manner is the same as the second indication manner.

As another example, the first indication manner is different from the second indication manner. Specifically, the bit fields used for bearing the indication information of the QCL parameter in the first indication manner and the second indication manner are at least partially different. For example, the first indication manner is indicating through 1 bit in the pdcch-ConfigSIB1 information field and 1 bit in the SSB-SubcarrierOffset information field, and the second indication manner is indicating through 1 bit in the pdcch-ConfigSIB1 information field and 1 bit in the subCrrierSpacingCommon information field. In such case, the first indication manner is different from the second indication manner.

As some examples, the first indication manner may be any one of following indication manners:

indicating the QCL parameter through K bits in the pdcch-ConfigSIB1 information field, K being a positive integer;

indicating the QCL parameter through A1 bits in the pdcch-ConfigSIB1 information field and B1 bits in the subCarrierSpacingCommon information field, A1 and B1 being positive integers;

indicating the QCL parameter through C1 bits in the pdcch-ConfigSIB1 information field and D1 bits in the SSB-SubcarrierOffset information field, C1 and D1 being positive integers; or indicating the QCL parameter through E1 bits in the SSB-SubcarrierOffset information field and F1 bits in the subCarrierSpacingCommon information field, E1 and F1 being positive integers.

It is to be understood that the number of bits occupied by each information field may be determined according to the number of the bits occupied by the indication information of the QCL parameter. As some examples, when the indication information of the QCL parameter occupies 2 bits, K is 2;

A1 is 1, and B1 is 1;
C1 is 1, and D1 is 1; and
E1 is 1, and F1 is 1.

As some examples, the second indication manner may be any one of following indication manners:

indicating the QCL parameter through K bits in the pdcch-ConfigSIB1 information field, K being a positive integer;

indicating the QCL parameter through A2 bits in the pdcch-ConfigSIB1 information field and B2 bits in the subCarrierSpacingCommon information field, A and B being positive integers;

indicating the QCL parameter through C2 bits in the pdcch-ConfigSIB1 information field and D2 bits in the SSB-SubcarrierOffset information field, C2 and D2 being positive integers; or indicating the QCL parameter through E2 bits in the SSB-SubcarrierOffset information field and F2 bits in the subCarrierSpacingCommon information field, E2 and F2 being positive integers.

It is to be understood that the number of bits occupied by each information field may be determined according to the number of the bits occupied by the indication information of the QCL parameter. As some examples, when the indication information of the QCL parameter occupies 2 bits, K is 2;

A2 is 1, and B2 is 1;
C2 is 1, and D2 is 1; and
E2 is 1, and F2 is 1.

Furthermore, in some embodiments, in response to the first SSB being not associated with SIB1, the first SSB may further include indication information of the frequency-domain position of the second SSB, the second SSB being associated with SIB1.

For example, the frequency-domain position of the second SSB may be indicated through an information field not configured to bear the indication information of the QCL parameter in the PBCH of the first SSB. For example, the frequency-domain position of the second SSB may be indicated through N bits in the SSB-SubcarrierOffset information field and M bits in the pdcch-ConfigSIB1 information field, N and M being positive integers. Alternatively, the frequency-domain position of the second SSB may be indicated through part or all of bits in another unused information field in the PBCH. No limits are made thereto in the embodiment of the disclosure.

The above descriptions are made only taking indicating the QCL parameter through part of bits in the pdcch-ConfigSIB1 information field, SSB-SubcarrierOffset information field, and subCarrierSpacingCommon information field in the PBCH as an example. However, the disclosure is not limited thereto. In another alternative embodiment, the QCL parameter may also be indicated through another information field in the PBCH. For example, in some embodiments, the network device may indicate the QCL parameter through other information field than the pdcch-ConfigSIB1 information field and the SSB-SubcarrierOffset information field.

In some embodiments, the other information field may include at least one of following information fields:
a subCarrierSpacingCommon information field;
an SFN information field;
a DMRS related information field;
a cellBarred information field;
a co-frequency cell reselection information field; or
an idle bit field.

As some examples, when the indication information of the QCL parameter occupies 2 bits, the QCL parameter may be indicated through 1 bit in the subCarrierSpacingCommon information field and 1 bit in the SFN information field, or the QCL parameter may be indicated through 2 bits in the cellBarred information field, or the QCL parameter may be indicated through 2 bits in the co-frequency cell reselection information field, etc.

Particularly, in response to the first SSB being not associated with SIB1, the network device may indicate the QCL parameter through other information field.

It can be understood that, in response to the first SSB being not associated with SIB1, the first SSB is required to bear the indication information of the frequency-domain position of the second SSB, and the QCL parameter may be indicated through other information field than the pdcch-ConfigSIB1 information field and the SSB-SubcarrierOffset information field in the PBCH. In such case, meanings of the existing pdcch-ConfigSIB1 information field and the SSB-SubcarrierOffset information field are not changed, and the conventional art is affected less. Moreover, in response to the first SSB being not associated with SIB1, information born in the other information field is actually meaningless. In such case, bearing the indication information of the QCL parameter using the information field is favorable for increasing the resource utilization rate of the system and further improving the system performance.

Descriptions will be made below in combination with embodiment 1 and embodiment 2 taking indicating the QCL parameter through the pdcch-ConfigSIB1 information field, SSB-SubcarrierOffset information field, and subCarrierSpacingCommon information field in the PBCH as an example. However, the embodiment of the disclosure is not limited thereto.

Embodiment 1

The network device may determine whether the first SSB bears the indication information of the QCL parameter based on whether the first SSB is associated with SIB1.

In the embodiment of the disclosure, the SIB1 association indication information may be born in the PBCH, for example, in the SSB-SubcarrierOffset information field of the PBCH, and is configured to indicate whether the first SSB is associated with SIB1 or a Type0-PDCCH common search space.

A first condition: the SIB1 association indication information indicates that the first SSB is not associated with SIB1, and the network device may determine that the first SSB does not bear the indication information of the QCL parameter. In such case, the first SSB may include the indication information of the frequency-domain position of the second SSB. For example, the frequency-domain position information of the second SSB may be indicated through part or all of bits in the SSB-SubcarrierOffset information field and the pdcch-ConfigSIB1 information field.

A second condition: the SIB1 association indication information indicates that the first SSB is associated with SIB1, and the network device may indicate the QCL parameter in the specific indication manner.

When the first SSB detected by the terminal device is not associated with SIB1, since the frequency-domain position of the second SSB is required to be indicated through an information field in the PBCH, and the terminal device is further required to continue detecting the second SSB to obtain the QCL parameter, the QCL parameter obtained from the first SSB is meaningless. Therefore, an SSB may not bear the indication information of the QCL parameter when the SSB is not associated with SIB1, and in such case, an indication manner for the frequency-domain position of the second QCL parameter may be continued to be indicated through the SSB-SubcarrierOffset information field and the pdcch-ConfigSIB1 information field, to achieve higher compatibility with the conventional art. In response to the first SSB being associated with SIB1, the terminal device may acquire the QCL parameter according to the first SSB and further jointly process SSBs that satisfy the QCL relationship, to improve the system performance.

Embodiment 2

The network device determines the indication manner for the QCL parameter in the first SSB based on whether the first SSB is associated with SIB1.

In embodiment 2, no matter whether the first SSB is associated with SIB1, the terminal device may obtain the QCL parameter based on the first SSB and further jointly process SSBs that satisfy the QCL relationship. In response to the first SSB being not associated with SIB1, improvement of the performance of receiving the second SSB is facilitated.

Specifically, in response to the first SSB being not associated with SIB1, it may be determined that the indication manner for the QCL parameter in the first SSB is the first indication manner. In response to the first SSB being associated with SIB1, it may be determined that the indication manner for the QCL parameter in the first SSB is the second indication manner.

Implementation modes of the first indication manner and the second indication manner refer to the related descriptions in the above embodiment and will not be elaborated herein.

Specific implementation of the first indication manner and the second indication manner will be described in combination with FIG. 4 to FIG. 7 taking the condition that the indication information of the QCL parameter occupies 2 bits as an example. When the indication information of the QCL parameter occupies another number of bits, the specific indication manner may be regulated. No limits are made thereto in the embodiment of the disclosure.

Embodiment 2-1

In response to the first SSB being not associated with SIB1, the QCL parameter may be indicated in the first indication manner. Specifically, as shown in FIG. 4, the first indication manner is indicating the QCL parameter through 1 bit in the pdcch-ConfigSIB1 information field and 1 bit in the subCarrierSpacingCommon information field.

Furthermore, the first SSB may further include the indication information of the frequency-domain position of the second SSB. As an example, an information field that bears the indication information of the frequency-domain position of the second SSB may include 5 bits (bit 0 to bit 4) in the SSB-SubcarrierOffset information field and 7 bits (for example, bit 0 to bit 6) in the pdcch-ConfigSIB1 information field.

As an example, when SSB-SubcarrierOffset is valued to 24 to 31, it indicates that the SSB is not associated with SIB1.

Figure 5:
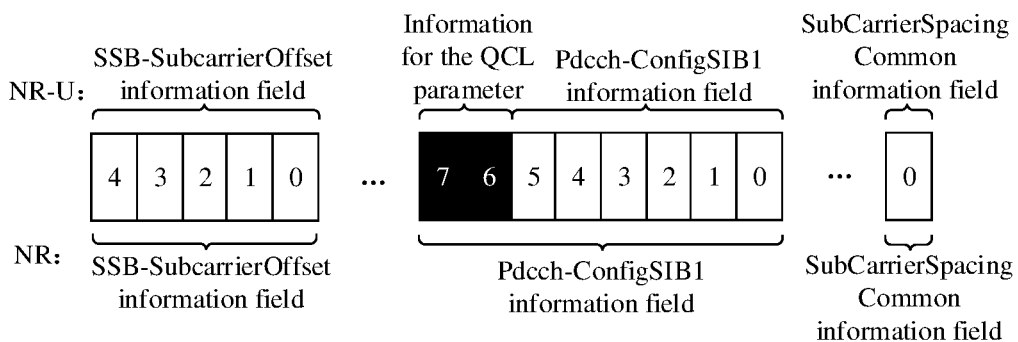
FIG. 5 is a schematic diagram of another indication manner for a QCL parameter according to an embodiment of the disclosure.

In response to the first SSB being associated with SIB1, the QCL parameter may be indicated in the second indication manner. Specifically, as shown in FIG. 5, the second indication manner is indicating the QCL parameter through 2 bits in the pdcch-ConfigSIB1 information field.

Furthermore, other information may be born through left bits in the information field of the PBCH. For example, information of a Control Resource Set (CORESET) and searchspacezero may be indicated through other 6 bits in the pdcch-ConfigSIB1 information field.

Embodiment 2-2

In response to the first SSB being not associated with SIB1, the QCL parameter may be indicated in the first indication manner. Specifically, as shown in FIG. 6, the first indication manner is indicating the QCL parameter through 1 bit in the pdcch-ConfigSIB1 information field and 1 bit in the SSB-SubcarrierOffset information field.

Furthermore, the first SSB may further include the indication information of the frequency-domain position of the second SSB. As an example, the information field that bears the indication information of the frequency-domain position of the second SSB may include 4 bits (bit 0 to bit 3) in the SSB-SubcarrierOffset information field and 7 bits (for example, bit 0 to bit 6) in the pdcch-ConfigSIB1 information field.

As an example, when SSB-SubcarrierOffset is valued to 12 to 15, it indicates that the SSB is not associated with SIB1.

In response to the first SSB being associated with SIB1, the QCL parameter may be indicated in the second indication manner. Specifically, as shown in FIG. 5, the second indication manner is indicating the QCL parameter through 2 bits in the pdcch-ConfigSIB1 information field.

Furthermore, other information may be born through the left bits in the information field of the PBCH. For example, the information of the CORESET and searchspacezero may be indicated through other 6 bits (for example, bit 0 to bit 5) in the pdcch-ConfigSIB1 information field.

Embodiment 2-3

In response to the first SSB being not associated with SIB1, the QCL parameter may be indicated in the first indication manner. Specifically, as shown in FIG. 6, the first indication manner is indicating the QCL parameter through 1 bit in the pdcch-ConfigSIB1 information field and 1 bit in the SSB-SubcarrierOffset information field.

Furthermore, the first SSB may further include the indication information of the frequency-domain position of the second SSB. As an example, the information field that bears the indication information of the frequency-domain position of the second SSB may include 4 bits (bit 0 to bit 3) in the SSB-SubcarrierOffset information field and 7 bits (for example, bit 0 to bit 6) in the pdcch-ConfigSIB1 information field.

As an example, when SSB-SubcarrierOffset is valued to 12 to 15, it indicates that the SSB is not associated with SIB1.

In response to the first SSB being associated with SIB1, the QCL parameter may be indicated in the second indication manner. Specifically, as shown in FIG. 7, the second indication manner is indicating the QCL parameter through 1 bit in the SSB-SubcarrierOffset information field and 1 bit in the subCarrierSpacingCommon information field.

Furthermore, other information may be born through the left bits in the information field of the PBCH. For example, the information of the CORESET and searchspacezero may be indicated through the 8 bits (for example, bit 0 to bit 7) in the pdcch-ConfigSIB1 information field. As such, the meaning of the pdcch-ConfigSIB1 information field in the NR-U system may be the same as that in the NR system.

Embodiment 2-4

In response to the first SSB being not associated with SIB1, the QCL parameter may be indicated in the first indication manner. Specifically, as shown in FIG. 7, the first indication manner is indicating the QCL parameter through 1 bit in the SSB-SubcarrierOffset information field and 1 bit in the subCarrierSpacingCommon information field.

Furthermore, the first SSB may further include the indication information of the frequency-domain position of the second SSB. As an example, the information field that bears the indication information of the frequency-domain position of the second SSB may include 8 bits (bit 0 to bit 7) in the pdcch-ConfigSIB1 information field.

As an example, when SSB-SubcarrierOffset is valued to 12 to 15, it indicates that the SSB is not associated with SIB1.

In response to the first SSB being associated with SIB1, the QCL parameter may be indicated in the second indication manner. Specifically, as shown in FIG. 4, the second indication manner is indicating the QCL parameter through 1 bit in the pdcch-ConfigSIB1 information field and 1 bit in the subCarrierSpacingCommon information field.

Furthermore, other information may be born through the left bits in the information field of the PBCH. For example, the information of the CORESET and searchspacezero may be indicated through the left 7 bits (for example, bit 0 to bit 6) in the pdcch-ConfigSIB1 information field.

It is to be understood that the indication manners shown in embodiment 2-1 to embodiment 2-4 are merely examples, and the first indication manner and the second indication manner may also be combinations of other indication manners. For example, the first indication manner is the indication manner shown in FIG. 4, and the second indication manner is the indication manner shown in FIG. 6. For another example, the first indication manner is the indication manner shown in FIG. 5, and the second indication manner is the indication manner shown in FIG. 7. The embodiment of the disclosure is not limited thereto.

It is also to be understood that, in the embodiment of the disclosure, a position of 1 bit or 2 bits in the information field may be any position, and no limits are made thereto in the embodiment of the disclosure. The 1 bit in the pdcch-ConfigSIB1 information field may be bit 0 or bit 7 in the pdcch-ConfigSIB1 information field or may be another bit.

Moreover, when the QCL parameter is indicated by combining at least two bits, positions of the at least two bits in the indication information are not specifically limited. For example, when the QCL parameter is indicated through 1 bit in the pdcch-ConfigSIB1 information field and 1 bit in the subCarrierSpacingCommon information field, the 1 bit in the pdcch-ConfigSIB1 information field may be a higher bit, or, the 1 bit in the subCarrierSpacingCommon information field may be a higher bit. No limits are made thereto in the embodiment of the disclosure. The embodiment of the disclosure is intended to describe the information field that bears the indication information of the QCL parameter and the number of bits occupied by the indication information in the information field, and a specific sequence of the bits is not limited.

In embodiment 2, the network device may determine different indication manners (or different bearing manners) for the indication information of the QCL parameter in the PBCH based on the SIB1 association indication information, which is favorable for ensuring that the terminal device correctly receives the indication information of the QCL parameter.

Furthermore, in response to the first SSB being not associated with SIB1, the terminal device may still obtain the indication information of the QCL parameter, thereby improving the performance of receiving the second SSB. Moreover, the network device may indicate the QCL parameter in different indication manners based on whether the SSB is associated with SIB1, so that a conflict caused by overlapping between the information field for the indication information of the frequency-domain position of the second SSB and the information field for the indication information of the QCL parameter may be avoided.

The method for wireless communication according to the embodiment of the disclosure is described above in combination with FIG. 3 to FIG. 7 in detail from the angle of the network device. A method for wireless communication according to another embodiment of the disclosure will be described below in combination with FIG. 8 in detail from the angle of the terminal device. It is to be understood that descriptions made on a terminal device side correspond to the descriptions made on a network device side, and similar descriptions may refer to the above and, for avoiding repetitions, will not be elaborated herein.

FIG. 8 is a schematic flowchart of a method 300 for wireless communication according to another embodiment of the disclosure. The method 300 may be executed by the terminal device in the communication system shown in FIG. 1. As shown in FIG. 8, the method 300 includes the following contents.

In S310, the terminal device receives a first SSB, the first SSB including SIB1 association indication information, and the SIB1 association indication information being configured to indicate whether the first SSB is associated with SIB1.

In S320, the terminal device determines whether the first SSB bears indication information of a QCL parameter and/or an indication manner for the QCL parameter in the first SSB based on whether the first SSB is associated with SIB1.

In some embodiments, the operation that the terminal device determines whether the first SSB bears the indication information of the QCL parameter and/or the indication manner for the QCL parameter in the first SSB based on whether the first SSB is associated with SIB1 may include the following operations.

In response to the first SSB being not associated with SIB1, it is determined that the first SSB does not include the indication information of the QCL parameter.

In response to the first SSB being associated with SIB1, it is determined that the first SSB includes the indication information of the QCL parameter.

In some embodiments, the method may further include the following operation.

When the first SSB includes the indication information of the QCL parameter, it is determined that the indication manner for the QCL parameter in the first SSB is a specific indication manner.

In some embodiments, the specific indication manner may be any one of following indication manners:

indicating the QCL parameter through K bits in a pdcch-ConfigSIB1 information field, K being a positive integer;

indicating the QCL parameter through A1 bits in the pdcch-ConfigSIB1 information field and B1 bits in a subCarrierSpacingCommon information field, A1 and B1 being positive integers;

indicating the QCL parameter through C1 bits in the pdcch-ConfigSIB1 information field and D1 bits in a SSB-SubcarrierOffset information field, C1 and D1 being positive integers; or indicating the QCL parameter through E1 bits in the SSB-SubcarrierOffset information field and F1 bits in the subCarrierSpacingCommon information field, E1 and F1 being positive integers.

In some embodiments, the operation that the terminal device determines whether the first SSB bears the indication information of the QCL parameter and/or the indication manner for the QCL parameter in the first SSB based on whether the first SSB is associated with SIB1 may include the following operations.

In response to the first SSB being not associated with SIB1, it is determined that the indication manner for the QCL parameter in the first SSB is a first indication manner; or, in response to the first SSB being associated with SIB1, it is determined that the indication manner for the QCL parameter in the first SSB is a second indication manner.

In some embodiments, bit fields used for bearing the indication information of the QCL parameter in the first indication manner and the second indication manner are the same.

In some embodiments, the bit fields used for bearing the indication information of the QCL parameter in the first indication manner and the second indication manner are at least partially different.

In some embodiments, the first indication manner may be any one of following indication manners:

indicating the QCL parameter through K bits in the pdcch-ConfigSIB1 information field, K being a positive integer;

indicating the QCL parameter through A1 bits in the pdcch-ConfigSIB1 information field and B1 bits in the subCarrierSpacingCommon information field, A1 and B1 being positive integers;

indicating the QCL parameter through C1 bits in the pdcch-ConfigSIB1 information field and D1 bits in the SSB-SubcarrierOffset information field, C1 and D1 being positive integers; or indicating the QCL parameter through E1 bits in the SSB-SubcarrierOffset information field and F1 bits in the subCarrierSpacingCommon information field, E1 and F1 being positive integers.

In some embodiments, K is 2;
A1 is 1, and B1 is 1;
C1 is 1, and D1 is 1; and
E1 is 1, and F1 is 1.

In some embodiments, the second indication manner may be any one of following indication manners:

indicating the QCL parameter through K bits in the pdcch-ConfigSIB1 information field, K being a positive integer;

indicating the QCL parameter through A2 bits in the pdcch-ConfigSIB1 information field and B2 bits in the subCarrierSpacingCommon information field, A and B being positive integers;

indicating the QCL parameter through C2 bits in the pdcch-ConfigSIB1 information field and D2 bits in the SSB-SubcarrierOffset information field, C2 and D2 being positive integers; or indicating the QCL parameter through E2 bits in the SSB-SubcarrierOffset information field and F2 bits in the subCarrierSpacingCommon information field, E2 and F2 being positive integers.

In some embodiments, K is 2;
A2 is 1, and B2 is 1;
C2 is 1, and D2 is 1; and
E2 is 1, and F2 is 1.

In some embodiments, in response to the first SSB being not associated with SIB1, the first SSB may further include indication information of a frequency-domain position of a second SSB.

In some embodiments, the frequency-domain position of the second SSB may be indicated through N bits in the SSB-SubcarrierOffset information field and M bits in the pdcch-ConfigSIB1 information field in the PBCH of the first SSB, N and M being positive integers.

In some embodiments, N is 4 or 5, and M is 6, 7, or 8.

The method embodiments of the disclosure are described above in combination with FIG. 3 to FIG. 8 in detail, and device embodiments of the disclosure will be described below in combination with FIG. 9 to FIG. 13 in detail. It is to be understood that the device embodiments correspond to the method embodiments and similar descriptions may refer to the method embodiments.

Figure 9:
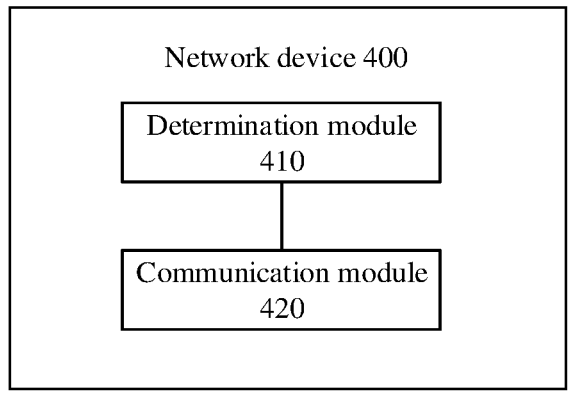
FIG. 9 is a schematic block diagram of a network device according to an embodiment of the disclosure.

FIG. 9 is a schematic block diagram of a network device 400 according to an embodiment of the disclosure. As shown in FIG. 9, the network device 400 includes a determination module 410 and a communication module 420.

The determination module 410 is configured to determine SIB1 association indication information of a first SSB, the SIB1 association indication information being configured to indicate whether the first SSB is associated with SIB1, and determine whether the first SSB bears indication information of a QCL parameter and/or an indication manner for the QCL parameter in the first SSB based on whether the first SSB is associated with SIB1.

The communication module 420 is configured to send the first SSB.

Optionally, in some embodiments, the determination module 410 is configured to:

in response to the first SSB being not associated with SIB1, determine that the first SSB does not include the indication information of the QCL parameter; or in response to the first SSB being associated with SIB1, determine that the first SSB includes the indication information of the QCL parameter.

Optionally, in some embodiments, the determination module 410 is further configured to:

when the first SSB includes the indication information of the QCL parameter, determine that the indication manner for the QCL parameter in the first SSB is a specific indication manner.

Optionally, in some embodiments, the specific indication manner may be any one of following indication manners:

indicating the QCL parameter through K bits in a pdcch-ConfigSIB1 information field, K being a positive integer;

indicating the QCL parameter through A bits in the pdcch-ConfigSIB1 information field and B bits in a subCarrierSpacingCommon information field, A and B being positive integers;

indicating the QCL parameter through C bits in the pdcch-ConfigSIB1 information field and D bits in an SSB-SubcarrierOffset information field, C and D being positive integers; or indicating the QCL parameter through E bits in the SSB-SubcarrierOffset information field and F bits in the subCarrierSpacingCommon information field, E and F being positive integers.

Optionally, in some embodiments, the determination module 410 is further configured to:

in response to the first SSB being not associated with SIB1, determine that the indication manner for the QCL parameter in the first SSB is a first indication manner, or, in response to the first SSB being associated with SIB1, determine that the indication manner for the QCL parameter in the first SSB is a second indication manner.

Optionally, in some embodiments, bit fields used for bearing the indication information of the QCL parameter in the first indication manner and the second indication manner are the same.

Optionally, in some embodiments, the bit fields used for bearing the indication information of the QCL parameter in the first indication manner and the second indication manner are at least partially different.

Optionally, in some embodiments, the first indication manner may be any one of following indication manners:

indicating the QCL parameter through K bits in the pdcch-ConfigSIB1 information field, K being a positive integer;

indicating the QCL parameter through A1 bits in the pdcch-ConfigSIB1 information field and B1 bits in the subCarrierSpacingCommon information field, A1 and B1 being positive integers;

indicating the QCL parameter through C1 bits in the pdcch-ConfigSIB1 information field and D1 bits in the SSB-SubcarrierOffset information field, C1 and D1 being positive integers; or indicating the QCL parameter through E1 bits in the SSB-SubcarrierOffset information field and F1 bits in the subCarrierSpacingCommon information field, E1 and F1 being positive integers.

Optionally, in some embodiments, K is 2;
A1 is 1, and B1 is 1;
C1 is 1, and D1 is 1; and
E1 is 1, and F1 is 1.

Optionally, in some embodiments, the second indication manner may be any one of following indication manners:

indicating the QCL parameter through K bits in the pdcch-ConfigSIB1 information field, K being a positive integer;

indicating the QCL parameter through A2 bits in the pdcch-ConfigSIB1 information field and B2 bits in the subCarrierSpacingCommon information field, A and B being positive integers;

indicating the QCL parameter through C2 bits in the pdcch-ConfigSIB1 information field and D2 bits in the SSB-SubcarrierOffset information field, C2 and D2 being positive integers; or indicating the QCL parameter through E2 bits in the SSB-SubcarrierOffset information field and F2 bits in the subCarrierSpacingCommon information field, E2 and F2 being positive integers.

Optionally, in some embodiments, K is 2;
A2 is 1, and B2 is 1;
C2 is 1, and D2 is 1; and
E2 is 1, and F2 is 1.

Optionally, in some embodiments, in response to the first SSB being not associated with SIB1, the first SSB may further include indication information of a frequency-domain position of a second SSB.

Optionally, in some embodiments, the frequency-domain position of the second SSB may be indicated through N bits in the SSB-SubcarrierOffset information field and M bits in the pdcch-ConfigSIB1 information field in the PBCH of the first SSB, N and M being positive integers.

Optionally, in some embodiments, N is 4 or 5, and M is 6, 7, or 8.

Optionally, in some embodiments, the communication module may be a communication interface or a transceiver, or a communication chip, or an input/output interface of a system on chip. The determination module may be one or more processors.

It is to be understood that the network device 400 according to the embodiment of the disclosure may correspond to the network device in the method embodiment of the disclosure, and the abovementioned and other operations and/or functions of each unit in the network device 400 are used to implement the corresponding flows executed by the network device in the method 200 shown in FIG. 3 respectively and will not be elaborated herein for simplicity.

Figure 10:
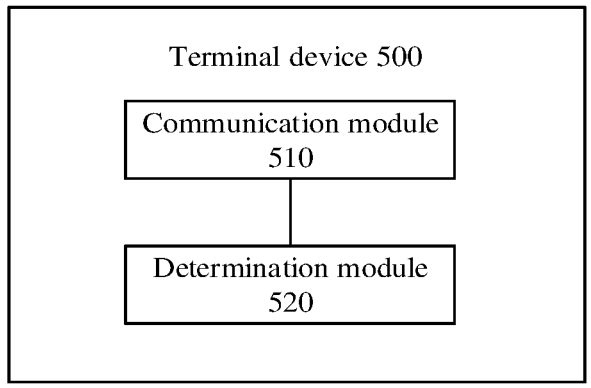
FIG. 10 is a schematic block diagram of a terminal device according to an embodiment of the disclosure.

FIG. 10 is a schematic block diagram of a terminal device according to an embodiment of the disclosure. The terminal device 500 shown in FIG. 10 includes a communication module 510 and a determination module 520.

The communication module 510 is configured to receive a first SSB, the first SSB including SIB1 association indication information, and the SIB1 association indication information being configured to indicate whether the first SSB is associated with SIB1.

The determination module 520 is configured to determine whether the first SSB bears indication information of a QCL parameter and/or an indication manner for the QCL parameter in the first SSB based on whether the first SSB is associated with SIB1.

Optionally, in some embodiments, the determination module 520 is specifically configured to:

in response to the first SSB being not associated with SIB1, determine that the first SSB does not include the indication information of the QCL parameter; and in response to the first SSB being associated with SIB1, determine that the first SSB includes the indication information of the QCL parameter.

Optionally, in some embodiments, the determination module 520 is further configured to:

when the first SSB includes the indication information of the QCL parameter, determine that the indication manner for the QCL parameter in the first SSB is a specific indication manner.

Optionally, in some embodiments, the specific indication manner may be any one of following indication manners:

indicating the QCL parameter through K bits in a pdcch-ConfigSIB1 information field, K being a positive integer;

indicating the QCL parameter through A1 bits in the pdcch-ConfigSIB1 information field and B1 bits in a sub-CarrierSpacingCommon information field, A1 and B1 being positive integers;

indicating the QCL parameter through C1 bits in the pdcch-ConfigSIB1 information field and D1 bits in an SSB-SubcarrierOffset information field, C1 and D1 being positive integers; or indicating the QCL parameter through E1 bits in the SSB-SubcarrierOffset information field and F1 bits in the subCarrierSpacingCommon information field, E1 and F1 being positive integers.

Optionally, in some embodiments, the determination module 520 is further configured to:

in response to the first SSB being not associated with SIB1, determine that the indication manner for the QCL parameter in the first SSB is a first indication manner, or, in response to the first SSB being associated with SIB1, determine that the indication manner for the QCL parameter in the first SSB is a second indication manner.

Optionally, in some embodiments, bit fields used for bearing the indication information of the QCL parameter in the first indication manner and the second indication manner are the same.

Optionally, in some embodiments, the bit fields used for bearing the indication information of the QCL parameter in the first indication manner and the second indication manner are at least partially different.

Optionally, in some embodiments, the first indication manner may be any one of following indication manners:

indicating the QCL parameter through K bits in the pdcch-ConfigSIB1 information field, K being a positive integer;

indicating the QCL parameter through A1 bits in the pdcch-ConfigSIB1 information field and B1 bits in the subCarrierSpacingCommon information field, A1 and B1 being positive integers;

indicating the QCL parameter through C1 bits in the pdcch-ConfigSIB1 information field and D1 bits in the SSB-SubcarrierOffset information field, C1 and D1 being positive integers; or indicating the QCL parameter through E1 bits in the SSB-SubcarrierOffset information field and F1 bits in the subCarrierSpacingCommon information field, E1 and F1 being positive integers.

Optionally, in some embodiments, K is 2;
A1 is 1, and B1 is 1;
C1 is 1, and D1 is 1; and
E1 is 1, and F1 is 1.

Optionally, in some embodiments, the second indication manner may be any one of following indication manners:

indicating the QCL parameter through K bits in the pdcch-ConfigSIB1 information field, K being a positive integer;

indicating the QCL parameter through A2 bits in the pdcch-ConfigSIB1 information field and B2 bits in the subCarrierSpacingCommon information field, A and B being positive integers;

indicating the QCL parameter through C2 bits in the pdcch-ConfigSIB1 information field and D2 bits in the SSB-SubcarrierOffset information field, C2 and D2 being positive integers; or indicating the QCL parameter through E2 bits in the SSB-SubcarrierOffset information field and F2 bits in the subCarrierSpacingCommon information field, E2 and F2 being positive integers.

Optionally, in some embodiments, K is 2;
A2 is 1, and B2 is 1;
C2 is 1, and D2 is 1; and
E2 is 1, and F2 is 1.

Optionally, in some embodiments, in response to the first SSB being not associated with SIB1, the first SSB may further include indication information of a frequency-domain position of a second SSB.

Optionally, in some embodiments, the frequency-domain position of the second SSB may be indicated through N bits in the SSB-SubcarrierOffset information field and M bits in the pdcch-ConfigSIB1 information field in the PBCH of the first SSB, N and M being positive integers.

Optionally, in some embodiments, N is 4 or 5, and M is 6, 7, or 8.

Optionally, in some embodiments, the communication module may be a communication interface or a transceiver, or a communication chip, or an input/output interface of a system on chip. The determination module may be one or more processors.

It is to be understood that the terminal device 500 according to the embodiment of the disclosure may correspond to the terminal device in the method embodiment of the disclosure and the abovementioned and other operations and/or functions of each unit in the terminal device 500 are adopted to implement the corresponding flows executed by the terminal device in the method 300 shown in FIG. 2 respectively and will not be elaborated herein for simplicity.

Figure 11:
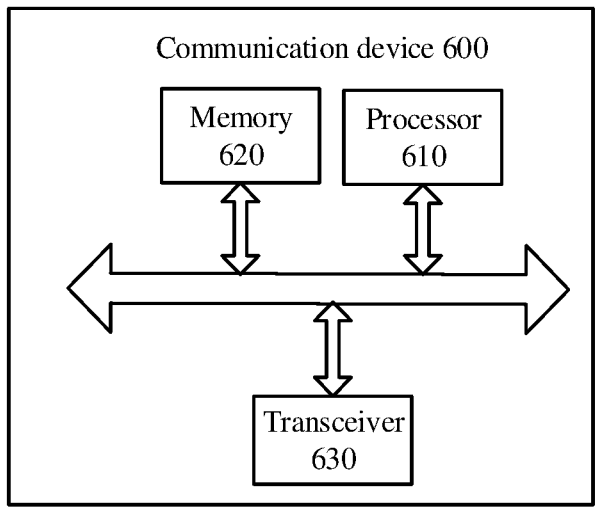
FIG. 11 is a schematic block diagram of a communication device according to another embodiment of the disclosure.

FIG. 11 is a schematic structure diagram of a communication device 600 according to an embodiment of the disclosure. The communication device 600 shown in FIG. 11 includes a processor 610, and the processor 610 may call and run a computer program in a memory to implement the method in the embodiments of the disclosure.

Optionally, as shown in FIG. 11, the communication device 600 may further include the memory 620. The processor 610 may call and run the computer program in the memory 620 to implement the method in the embodiments of the disclosure.

The memory 620 may be an independent device independent of the processor 610 and may also be integrated into the processor 610.

Optionally, as shown in FIG. 11, the communication device 600 may further include a transceiver 630, and the processor 610 may control the transceiver 630 to communicate with another device, specifically sending information or data to the other device or receiving information or data sent by the other device.

The transceiver 630 may include a transmitter and a receiver. The transceiver 630 may further include antennae, and the number of the antennae may be one or more.

Optionally, the communication device 600 may specifically be the network device of the embodiments of the disclosure, and the communication device 600 may implement corresponding flows implemented by the network device in each method of the embodiments of the disclosure. For simplicity, elaborations are omitted herein.

Optionally, the communication device 600 may specifically be the mobile terminal/terminal device of the embodiments of the disclosure, and the communication device 600 may implement corresponding flows implemented by the mobile terminal/terminal device in each method of the embodiments of the disclosure. For simplicity, elaborations are omitted herein.

Figure 12:
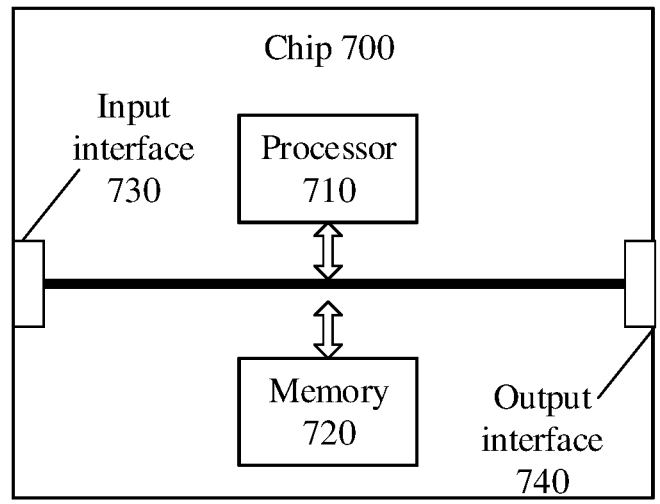
FIG. 12 is a schematic block diagram of a chip according to an embodiment of the disclosure.

FIG. 12 is a schematic structure diagram of a chip according to another embodiment of the disclosure. The chip 700 shown in FIG. 12 includes a processor 710, and the processor 710 may call and run a computer program in a memory to implement the method in the embodiments of the disclosure.

Optionally, as shown in FIG. 12, the chip 700 may further include the memory 720. The processor 710 may call and run the computer program in the memory 720 to implement the method in the embodiments of the disclosure.

The memory 720 may be an independent device independent of the processor 710 and may also be integrated into the processor 710.

Optionally, the chip 700 may further include an input interface 730. The processor 710 may control the input interface 730 to communicate with another device or chip, specifically acquiring information or data sent by the other device or chip.

Optionally, the chip 700 may further include an output interface 740. The processor 710 may control the output interface 740 to communicate with the other device or chip, specifically outputting information or data sent by the other device or chip.

Optionally, the chip may be applied to the network device of the embodiments of the disclosure, and the chip may implement corresponding flows implemented by the network device in each method of the embodiments of the disclosure. For simplicity, elaborations are omitted herein.

Optionally, the chip may be applied to the mobile terminal/terminal device of the embodiment of the disclosure, and the chip may implement corresponding flows implemented by the mobile terminal/terminal device in each method of the embodiment of the disclosure. For simplicity, elaborations are omitted herein.

It is to be understood that the chip mentioned in the embodiment of the disclosure may also be called a system-level chip, a system chip, a chip system, a system on chip, etc.

Figure 13:
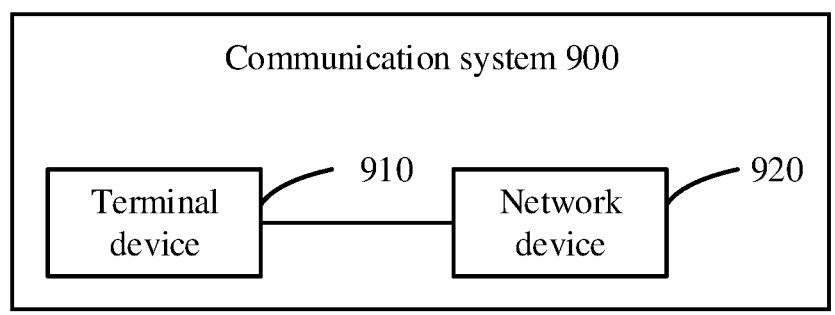
FIG. 13 is a schematic block diagram of a communication system according to an embodiment of the disclosure.

FIG. 13 is a second block diagram of a communication system 900 according to an embodiment of the disclosure. As shown in FIG. 13, a communication system 900 includes a terminal device 910 and a network device 920.

The terminal device 910 may be configured to realize corresponding functions realized by the terminal device in the method, and the network device 920 may be configured to realize corresponding functions realized by the network device in the method. For simplicity, elaborations are omitted herein.

It is to be understood that the processor in the embodiment of the disclosure may be an integrated circuit chip and has a signal processing capacity. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another Programmable Logic Device (PLD), a discrete gate or transistor logic device, and a discrete hardware component. Each method, step and logical block diagram disclosed in the embodiments of the disclosure may be implemented or executed. The universal processor may be a microprocessor, or the processor may also be any conventional processor, etc. The steps of the method disclosed in combination with the embodiments of the disclosure may be directly embodied to be executed and completed by a hardware decoding processor or executed and completed by a combination of hardware and software modules in the decoding processor. The software module may be in a mature storage medium in this field such as a Random Access Memory (RAM), a flash memory, a Read-Only Memory (ROM), a Programmable ROM (PROM) or Electrically Erasable PROM (EEPROM), and a register. The storage medium is in a memory, and the processor reads information in the memory and completes the steps of the method in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM, or a flash memory. The volatile memory may be a RAM and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM, and a DR RAM. That is, the memory in the embodiments of the disclosure is intended to include, but not limited to, memories of these and any other proper types.

The embodiments of the disclosure also provide a computer-readable storage medium, which is configured to store a computer program.

Optionally, the computer-readable storage medium may be applied to a network device in the embodiments of the disclosure, and the computer program enables a computer to execute corresponding flows implemented by the network device in each method of the embodiments of the disclosure. For simplicity, elaborations are omitted herein.

Optionally, the computer-readable storage medium may be applied to a mobile terminal/terminal device in the embodiments of the disclosure, and the computer program enables a computer to execute corresponding flows implemented by the mobile terminal/terminal device in each method of the embodiments of the disclosure. For simplicity, elaborations are omitted herein.

The embodiments of the disclosure also provide a computer program product, which includes a computer program instruction.

Optionally, the computer program product may be applied to a network device in the embodiments of the disclosure, and the computer program instruction enables a computer to execute corresponding flows implemented by the network device in each method of the embodiments of the disclosure. For simplicity, elaborations are omitted herein.

Optionally, the computer program product may be applied to a mobile terminal/terminal device in the embodiments of the disclosure, and the computer program instruction enables the computer to execute corresponding flows implemented by the mobile terminal/terminal device in each method of the embodiments of the disclosure. For simplicity, elaborations are omitted herein.

The embodiments of the disclosure also provide a computer program.

Optionally, the computer program may be applied to a network device in the embodiments of the disclosure, and the computer program runs in a computer to enable the computer to execute corresponding flows implemented by the network device in each method of the embodiments of the disclosure. For simplicity, elaborations are omitted herein.

Optionally, the computer program may be applied to a mobile terminal/terminal device in the embodiments of the disclosure, and the computer program runs in the computer to enable the computer to execute corresponding flows implemented by the mobile terminal/terminal device in each method of the embodiments of the disclosure. For simplicity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed by hardware or software depends on specific disclosures and design constraints of the technical solutions. Professionals may realize the described functions for each specific disclosure by use of different methods, but such realization shall fall within the scope of the disclosure.

Those skilled in the art may clearly learn about that specific working processes of the system, apparatus and unit described above may refer to the corresponding processes in the method embodiment and will not be elaborated herein for convenient and brief description.

In some embodiments provided in the disclosure, it is to be understood that the disclosed system, apparatus, and method may be implemented in another manner. For example, the apparatus embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the apparatus or the units, and may be electrical and mechanical or adopt other forms.

The units described as separate parts may or may not be physically separated, and parts displayed as units may or may not be physical units, and namely may be in the same place, or may also be distributed to multiple network units. Part or all of the units may be selected to achieve the purposes of the solutions of the embodiments according to a practical requirement.

In addition, each function unit in each embodiment of the disclosure may be integrated into a processing unit, each unit may also physically exist independently, and two or more than two units may also be integrated into a unit.

When realized in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The storage medium includes various media capable of storing program codes such as a U disk, a mobile hard disk, a ROM, a RAM, a magnetic disk, or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for wireless communication, comprising:
   sending, by a network device, a first Synchronization Signal Block (SSB) to a terminal device, the first SSB comprising System Information Block 1 (SIB1) association indication information, and the SIB1 association indication information being configured to indicate whether the first SSB is associated with SIB1;
   when the first SSB is not associated with SIB1, determining, by the network device, that the first SSB does not comprise indication information of a Quasi-Co-Located (QCL) parameter; or
   when the first SSB is associated with SIB1, determining, by the network device, that the first SSB comprises the indication information of the QCL parameter.

2. The method of claim 1, wherein
   when the first SSB is associated with SIB1, the QCL parameter is indicated through E1 bits in a SSB-SubcarrierOffset information field and F1 bits in a subCarrierSpacingCommon information field, E1 and F1 being positive integers.

3. The method of claim 1, wherein
   when the first SSB is not associated with SIB1, the first SSB further comprises indication information of a frequency-domain position of a second SSB; and
   wherein the frequency-domain position of the second SSB is indicated through N bits in a SSB-SubcarrierOffset information field and M bits in a pdcch-ConfigSIB1 information field in a Physical Broadcast Channel (PBCH) of the first SSB, N and M being positive integers.

4. A method for wireless communication, comprising:
   receiving, by a terminal device, a first Synchronization Signal Block (SSB), the first SSB comprising System Information Block 1 (SIB1) association indication information, and the SIB1 association indication information, and the SIB1 association indication information being configured to indicate whether the first SSB is associated with SIB1; and when the first SSB is not associated with SIB1, determining, by the terminal device, that the first SSB does not comprise indication information of a Quasi-Co-Located (QCL) parameter; or when the first SSB is associated with SIB1, determining, by the terminal device, that the first SSB comprises the indication information of the QCL parameter.

5. The method of claim 4, wherein
when the first SSB is associated with SIB1, the QCL parameter is indicated through E1 bits in a SSB-SubcarrierOffset information field and F1 bits in a subCarrierSpacingCommon information field, E1 and F1 being positive integers.

6. The method of claim 4, wherein
when the first SSB is not associated with SIB1, the first SSB further comprises indication information of a frequency-domain position of a second SSB; and
wherein the frequency-domain position of the second SSB is indicated through N bits in a SSB-SubcarrierOffset information field and M bits in a pdcch-ConfigSIB1 information field in a Physical Broadcast Channel (PBCH) of the first SSB, N and M being positive integers.

7. A network device, comprising:
a transceiver, configured to send a first Synchronization Signal Block (SSB) to a terminal device, the first SSB comprising System Information Block 1 (SIB1) association indication information, and the SIB1 association indication information being configured to indicate whether the first SSB is associated with SIB1; and
a processor, configured to:
when the first SSB is not associated with SIB1, determine that the first SSB does not comprise indication information of a Quasi-Co-Located (QCL) parameter; or
when the first SSB is associated with SIB1, determine that the first SSB comprises the indication information of the QCL parameter.

8. The network device of claim 7, wherein
when the first SSB is associated with SIB1, the QCL parameter is indicated through E1 bits in a SSB-SubcarrierOffset information field and F1 bits in a subCarrierSpacingCommon information field, E1 and F1 being positive integers.

9. The network device of claim 7, wherein
when the first SSB is not associated with SIB1, the first SSB further comprises indication information of a frequency-domain position of a second SSB; and
wherein the frequency-domain position of the second SSB is indicated through N bits in a SSB-SubcarrierOffset information field and M bits in a pdcch-ConfigSIB1 information field in a Physical Broadcast Channel (PBCH) of the first SSB, N and M being positive integers.

10. A terminal device, comprising:
a transceiver, configured to receive a first Synchronization Signal Block (SSB), the first SSB comprising System Information Block 1 (SIB1) association indication information, and the SIB1 association indication information being configured to indicate whether the first SSB is associated with SIB1; and
a processor, configured to:
when the first SSB is not associated with SIB1, determine that the first SSB does not comprise indication information of a Quasi-Co-Located (QCL) parameter; or
when the first SSB is associated with SIB1, determine that the first SSB comprises the indication information of the QCL parameter.

11. The terminal device of claim 10, wherein
when the first SSB is associated with SIB1, the QCL parameter is indicated through E1 bits in a SSB-SubcarrierOffset information field and F1 bits in a subCarrierSpacingCommon information field, E1 and F1 being positive integers.

12. The terminal device of claim 10, wherein
when the first SSB is not associated with SIB1, the first SSB further comprises indication information of a frequency-domain position of a second SSB; and
wherein the frequency-domain position of the second SSB is indicated through N bits in a SSB-SubcarrierOffset information field and M bits in a pdcch-ConfigSIB1 information field in a Physical Broadcast Channel (PBCH) of the first SSB, N and M being positive integers.

* * * * *